United States Patent
Shih et al.

(10) Patent No.: US 10,606,253 B2
(45) Date of Patent: Mar. 31, 2020

(54) METHOD OF MONITORING PROCESSING SYSTEM FOR PROCESSING SUBSTRATE

(71) Applicant: UNITED MICROELECTRONICS CORP., Hsinchu (TW)

(72) Inventors: Lian-Hua Shih, Chiayi (TW); Chia-Chi Chang, Tainan (TW); Li-Ting Lin, Tainan (TW); Ching-Hsing Hsieh, Zhubei (TW); Feng-Chi Chung, Zhunan Township (TW); Meng-Chih Chang, Kaohsiung (TW); Ming-Tung Wang, Jiadong Township (TW); Chiu-Ping Chang, Kaohsiung (TW); Yung-Yu Yang, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 159 days.

(21) Appl. No.: 15/427,279

(22) Filed: Feb. 8, 2017

(65) Prior Publication Data
US 2018/0224817 A1 Aug. 9, 2018

(51) Int. Cl.
*G05B 23/02* (2006.01)
(52) U.S. Cl.
CPC ................... *G05B 23/024* (2013.01)
(58) Field of Classification Search
None
See application file for complete search history.

(56) References Cited

U.S. PATENT DOCUMENTS

| | | | |
|---|---|---|---|
| 7,328,126 B2* | 2/2008 | Chamness | G05B 23/024 700/108 |
| 7,713,760 B2 | 5/2010 | Yue et al. | |
| 2004/0259276 A1* | 12/2004 | Yue | H01J 37/32935 438/5 |
| 2005/0019961 A1* | 1/2005 | Davis | G01N 21/73 438/7 |
| 2005/0060103 A1* | 3/2005 | Chamness | G05B 23/024 702/30 |
| 2005/0187649 A1* | 8/2005 | Funk | G05B 19/4184 700/121 |
| 2006/0058898 A1* | 3/2006 | Emigholz | C10G 11/187 700/29 |
| 2006/0184264 A1* | 8/2006 | Willis | G05B 19/4184 700/108 |
| 2012/0035755 A1* | 2/2012 | Byrne | G05B 17/02 700/97 |
| 2013/0144419 A1* | 6/2013 | Tsai | H01L 22/20 700/108 |

* cited by examiner

*Primary Examiner* — Jason Lin
(74) *Attorney, Agent, or Firm* — WPAT, PC

(57) ABSTRACT

A method of monitoring a processing system for processing a substrate is provided. The method includes the following steps: acquiring data from the processing system for a plurality of parameters, the data including a plurality of data values; grouping the parameters into a plurality of sub-groups, each of the sub-groups including a plurality of correlated parameters; constructing a principle components analysis (PCA) model from the data values for the correlated parameters in a first one of the sub-groups, including normalizing the data values in the first one of the sub-groups with a first weighting factor and a second weighting factor, wherein the first weighting factor is different from the second weighting factor; and determining a statistical quantity using the PCA model.

9 Claims, 5 Drawing Sheets

METHOD OF MONITORING PROCESSING SYSTEM FOR PROCESSING SUBSTRATE

BACKGROUND

Technical Field

The disclosure relates in general to a method of monitoring a processing system for processing a substrate, and more particularly to a method of monitoring a processing system for processing a substrate using a principle components analysis (PCA) model.

Description of the Related Art

In the whole manufacturing process, various processing parameters are required to be monitored and controlled for fault detections. However, difficulties of encountering large amount of various data parameters may be time-consuming and require a large number of monitor checks. Therefore, there is a desire in reducing the loading of monitoring and fault detections of manufacturing processes.

SUMMARY OF THE INVENTION

The disclosure is directed to a method of monitoring a processing system for processing a substrate. According to the embodiments of the present disclosure, by grouping processing parameters into sub-groups of correlated parameters and applying different weighting factors on different correlated parameters in one sub-group when constructing a PCA model for determining the statistical quantity, the statistical quantity provides a higher sensitivity to fault detection and an improved process control.

According to an embodiment of the present disclosure, a method of monitoring a processing system for processing a substrate is disclosed. The method includes the following steps: acquiring data from the processing system for a plurality of parameters, the data including a plurality of data values; grouping the parameters into a plurality of sub-groups, each of the sub-groups including a plurality of correlated parameters; constructing a principle components analysis (PCA) model from the data values for the correlated parameters in a first one of the sub-groups, including normalizing the data values in the first one of the sub-groups with a first weighting factor and a second weighting factor, wherein the first weighting factor is different from the second weighting factor; and determining a statistical quantity using the PCA model.

According to another embodiment of the present disclosure, a method of monitoring a processing system for processing a substrate is disclosed. The method includes the following steps: acquiring data from the processing system for a plurality of parameters in a first period of time, the data including a plurality of data values; grouping the parameters into a plurality of sub-groups, each of the sub-groups including a plurality of correlated parameters; constructing a principle components analysis (PCA) model from a first set of data values for the correlated parameters in a first one of the sub-groups; determining a statistical quantity using the PCA model; performing a prevention maintenance step to the processing system after the first period of time; acquiring a second set of data values for the correlated parameters in the first one of the sub-groups from the processing system in a second period of time after performing the prevention maintenance step; and determining an updated statistical quantity using a combination of the second set of data values and the PCA model.

The disclosure will become apparent from the following detailed description of the preferred but non-limiting embodiments. The following description is made with reference to the accompanying drawings.

DETAILED DESCRIPTION OF THE INVENTION

Figure 1:
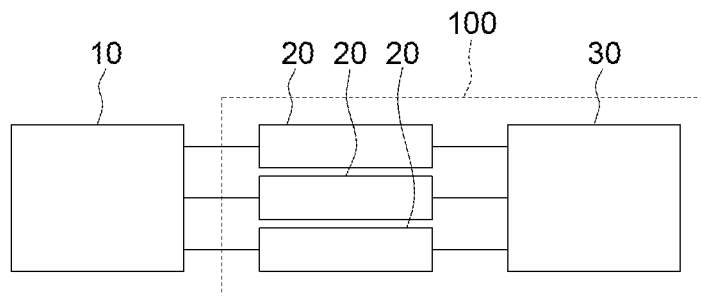
FIG. 1 shows a processing system according to an embodiment of the present disclosure.

According to the embodiments of the present disclosure, by grouping processing parameters into sub-groups of correlated parameters and applying different weighting factors on different correlated parameters in one sub-group when constructing a PCA model for determining the statistical quantity, the statistical quantity provides a higher sensitivity to fault detection and an improved process control. The identical or similar elements of the embodiments are designated with the same reference numerals. It is to be noted that the drawings are simplified for clearly describing the embodiments, and the details of the structures of the embodiments are for exemplification only, not for limiting the scope of protection of the disclosure. Ones having ordinary skills in the art may modify or change the structures according to the embodiments of the present disclosure.

According to an embodiment of the present disclosure, a semiconductor processing system 1 is provided. FIG. 1 shows a processing system according to an embodiment of the present disclosure. In the embodiment, the semiconductor processing system 1 may include a process tool 10 and a process performance monitoring system 100, and the process performance monitoring system 100 may include a plurality of sensors 20 and a controller 30. Substrates/wafers are transferred into the process tool 10 to be processed. The sensors 20 are coupled to the process tool 10 to measure data, and the controller 30 is coupled to the sensors 20 to receive data. The controller 30 may also be further coupled to the process tool 10. In the embodiments, the controller 30 is configured to monitor process performance data for process fault detection of the processes substrates/wafers.

Figure 2:
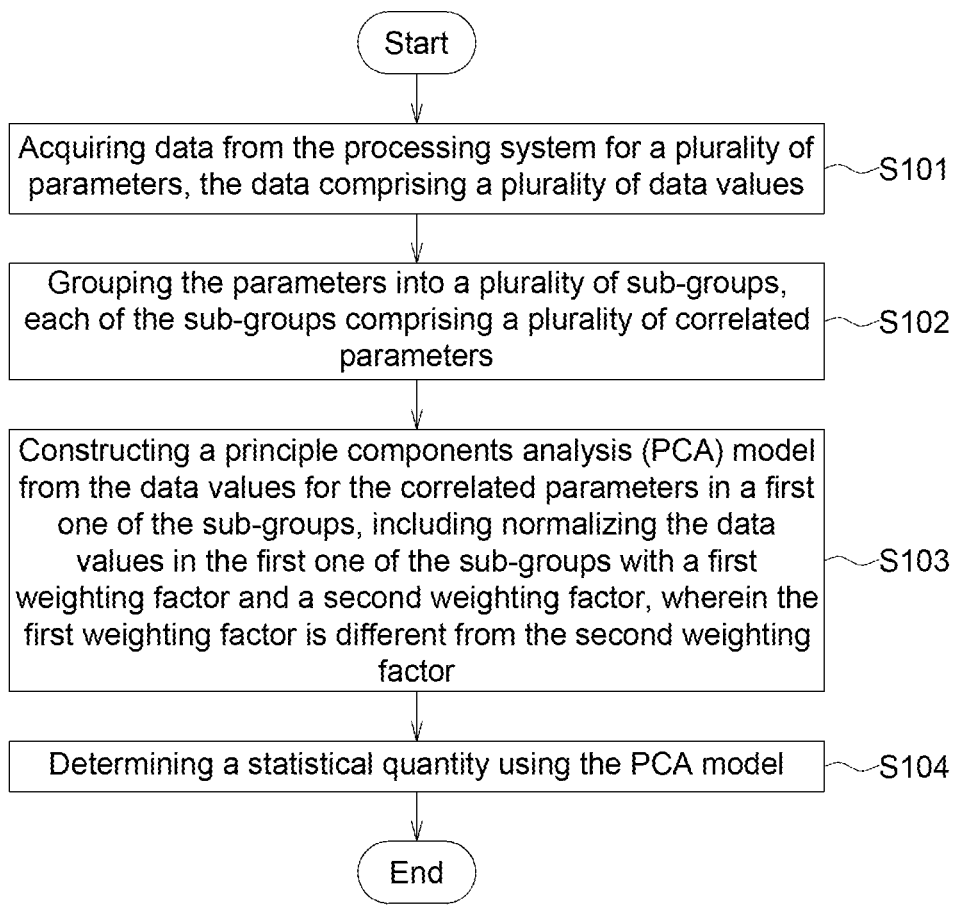
FIG. 2 presents a method of monitoring a processing system for processing a substrate according to an embodiment of the present disclosure.

FIG. 2 presents a method of monitoring a processing system for processing a substrate according to an embodiment of the present disclosure.

First, at step S101, the method starts with acquiring data from the processing system for a plurality of parameters, the data including a plurality of data values. The processing system may be a film deposition system, a CVD system, a PVD system, an etching system, a plasma system, and etc. The data from the processing system can be acquired using a plurality of sensors, as shown in FIG. 1, coupled to the processing system and a controller.

In the embodiments, the data may include at least one of the following: a temperature of a heat exchanger, a resistivity of a heat exchanger, a distance from a heater to a shower head, a power output of a heater, a temperature reading of a heater, an RF forward power, an RF impedance, an electrode voltage, an RF reflective power, an argon flow rate, a helium flow rate during an atom transfer radical polymerization (ATRP), a helium flow rate of an oxygenator, an oxygen flow rate, a helium flow rate, a flow rate of an oxygenator, a flow rate of an atom transfer radical polymerization, a chamber pressure reading, a position of a throttle valve, and a chamber pressure supplied, but not limited thereto. For example, the data may include the data value(s) of at least one of the above parameters.

Next, as shown in FIG. 2, at step S102, the parameters are grouped into a plurality of sub-groups, each of the sub-groups including a plurality of correlated parameters. For example, the above mentioned parameters can be grouped into three sub-groups including a heater sub-group, an RF sub-group and a pressure sub-group, which will be illustrated in Table 1 hereinafter. The parameters in the same sub-group are correlated. That is, adjusting one parameter may correspondingly influence the data value of another parameter in the same sub-group, and an observed change of the data value in one parameter may be resulted from an adjustment of another parameter in the same sub-group. For example, when a power output of a heater is changed, the temperature of the heater is correspondingly changed, and thus the data values of these two parameters are considered correlated and can be monitored together.

In some embodiments, after a large number of parameters of the processing system are grouped into sub-groups, each one of the sub-groups includes less than ten correlated parameters.

Next, at step S103, a principle components analysis (PCA) model is constructed from the data values for the correlated parameters in a first one of the sub-groups. That is, at this step, a PCA model is not construed from all of the acquired data values of all of the parameters; instead, a PCA model is constructed from only the data values of the correlated parameters in one sub-group. In some embodiments, the PCA model may be constructed by utilizing various commercial available tools/software, such as MATLAB or R Language, but not limited thereto.

At the present step, constructing the PCA model further includes normalizing the data values in the first one of the sub-groups with a first weighting factor and a second weighting factor, wherein the first weighting factor is different from the second weighting factor.

In some embodiments, the normalization of the data values in the first one of the sub-groups may include applying the first weighting factor to a first one of the data values and the second weighting factor to a second one of the data values in the first one of the sub-groups. That is, the data values of different correlated parameters in the same sub-group are normalized with at least two different weighting factors. In some embodiments, the normalization is based on the following equation for each of the correlated parameters in one sub-group, and the normalized result Z' can be expressed by the following equation:

$$Z'=(P/Pa)/(Z*\delta);$$

where P represents a measured data value of a parameter, Pa represents an average value of the data values of the parameter, Z represents the weighting factor for the parameter, and $\delta$ represents the standard deviation of the data values of the parameter.

When the data values of the correlated parameters in a sub-group are normalized applying the above equation, each of the parameters may be applied with different weighting factors according to the predetermined significance of each of the parameters. The smaller the Z value a parameter is applied with, the more significantly the parameter is contributed to the PCA model; in other words, the PCA model is more sensitive to the data values of the parameter with a smaller Z value.

Next, at step S104, a statistical quantity is determined using the PCA model. In some embodiments, the statistical quantity may be a Hotelling $T^2$ parameter.

Next, a control limit may be further determined for the statistical quantity, and the statistical quantity may be compared to the control limit, wherein a process fault has occurred when the statistical quantity exceeds the control limit. When a process fault is detected, an operator can be notified.

According to the embodiments of the present disclosure, the statistical quantity can be used as a processing system health index for fault detection and process control. Particularly, by grouping processing parameters into sub-groups of correlated parameters and applying different weighting factors on different correlated parameters in one sub-group when constructing a PCA model for determining the statistical quantity, the statistical quantity provides a higher sensitivity to fault detection and an improved process control.

Figure 3:
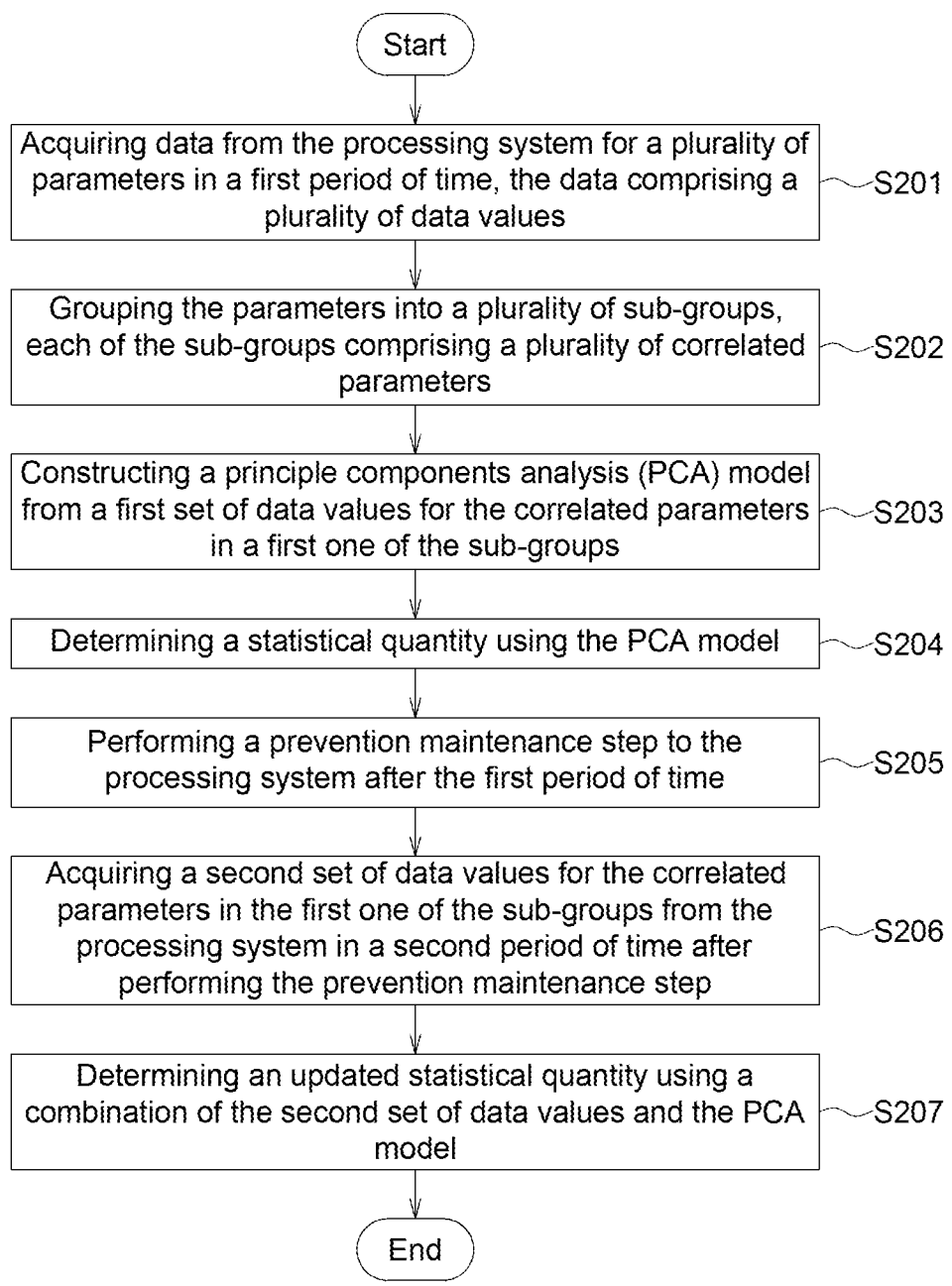
FIG. 3 presents a method of monitoring a processing system for processing a substrate according to another embodiment of the present disclosure.

FIG. 3 presents a method of monitoring a processing system for processing a substrate according to another embodiment of the present disclosure.

As shown in FIG. 3, at step S201, the method starts with acquiring data from the processing system for a plurality of parameters in a first period of time, the data including a plurality of data values; next, at step S202, the parameters are grouped into a plurality of sub-groups, each of the sub-groups including a plurality of correlated parameters. These two steps are substantially the same as the previously-described steps S101 and S102, and the descriptions are omitted.

Next, at step S203, a principle components analysis (PCA) model is constructed from a first set of the data values for the correlated parameters in a first one of the sub-groups. That is, at this step, a PCA model is not construed from all of the acquired data values of all of the parameters; instead, a PCA model is constructed from only the first set of the data values of the correlated parameters in one sub-group acquired in the first period of time. In some embodiments, the PCA model may be constructed by utilizing various commercial available tools, such as MATLAB or R Language, but not limited thereto.

At the present step, constructing the PCA model may optionally further includes normalizing the first set of the data values in the first one of the sub-groups with a first weighting factor and a second weighting factor, wherein the first weighting factor is different from the second weighting factor. This optional normalization operation is substantially the same as the previously-described normalization operation at step S103, and the descriptions are omitted.

Next, at step S204, a statistical quantity is determined using the PCA model. In some embodiments, the statistical quantity may be a Hotelling $T^2$ parameter.

Next, at step S205, a prevention maintenance step is performed to the processing system after the first period of time. In some embodiments, the prevention maintenance step may include at least one of cleaning the processing system, replacing a component of the processing system, and repairing a component of the processing system.

Next, at step S206, a second set of data values for the correlated parameters in the first one of the sub-groups are acquired from the processing system in a second period of time after performing the prevention maintenance step. That is, after the first set of data values for the correlated parameters in one sub-group are acquired in the first period of time and a statistical quantity is determined from the first set of data values using a PCA model in the first period of time, followed by performing the prevention maintenance step after the first period of time, a second set of data values of the same correlated parameters in the same sub-group are acquired in a second period of time, which is subsequent to the first period of time.

Next, at step S207, an updated statistical quantity is determined using a combination of the second set of data values and the PCA model. More specifically, the updated statistical quantity is determined using a combination of the second set of data values acquired in the second period of time and the PCA model constructed from the first set of data values acquired in the first period of time, and the first set of data values and the second set of values are for the same correlated parameters in the same sub-group. In other words, the original statistical quantity and the updated statistical quantity both refer to the same correlated parameters in the same sub-group; while the original statistical quantity obtained from the data values collected in the first period of time and the prevention maintenance step may cause a shift in value of the statistical quantity, the updated statistical quantity obtained incorporating the second set of data values acquired in the second period of time after the prevention maintenance step provides an auto-corrected index for the fault detection of the correlated parameters in the same sub-group after the prevention maintenance step is performed.

In the embodiments, the method of the present disclosure may optionally further include the followings. In an embodiment, the second set of data values may include a first group of data values and a second group of data values acquired subsequent to the first group of data values, and the method may further include determining whether a current data value of the second group of data values exceeds an estimated statistical quantity or not, wherein the estimated statistical quantity is determined using a combination of precious data values of the second set of data values acquired in the second period of time and the PCA model; and constructing an updated PCA model using a combination of the current data value, the previous data values and the PCA model for determining the updated statistical quantity when the current data value does not exceed the estimated statistical quantity.

In other words, acquiring the second set of data values includes acquiring a first group of data values and then acquiring a second group of data values. In the embodiments, an estimated statistical quantity is determined using the first group of data values of the second set of data values acquired in the second period of time, the PCA model construed in the first period of time, and optionally at least one data value, which is the aforementioned precious data values, from the second group of data values of the second set of data values. With every additional data value, which is the aforementioned current data value, acquired, an updated PCA model is further constructed for the current processing system as long as the acquired additional data value does not exceed the current estimated statistical quantity, and a renew estimated statistical quantity is further determined. On the contrary, if the current data value exceeds the current estimated statistical quantity, the current data value will be abandoned, and another additional data value will be acquired, and an updated PCA model will be constructed if this another additional data value does not exceed the current estimated statistical quantity. This process can repeat multiple times to keep updating the updated PCA model with more additional data values of the second set of data values acquired, and this repeating process is called a "training set," in which the updated PCA model is constantly and slightly changing and auto-refreshing. When the "training set" ends, instead of obtaining another renew estimated statistical quantity, an updated statistical quantity is determined from the updated PCA model constructed using a combination of the first group and the second group of the second set of data values acquired in the second period of time and the PCA model constructed in the first period of time.

Next, a control limit may be further determined for the updated statistical quantity, and the updated statistical quantity may be compared to the control limit, wherein a process fault of the current processing system, which is after performing the prevention maintenance step, has occurred when the updated statistical quantity exceeds the control limit. When a process fault is detected, an operator can be notified.

According to the embodiments of the present disclosure, the updated statistical quantity can be used as a processing system health index for fault detection and process control after performing a prevention maintenance step. Particularly, by auto-refreshing updated PCA model(s) from a combination of the second set of data values acquired in the second period of time after the prevention maintenance step and the PCA model constructed from the first set of data values acquired in the first period of time, the updated statistical quantity can be determined for providing a more accurate fault detection and improved process control.

Further explanation is provided with the following examples. However, the following examples are for purposes of describing particular embodiments only, and are not intended to be limiting. Table 1 shows some exemplary examples of processing parameters and the sub-groups of correlated parameters. It is to be noted that the following parameters are for examples only, and the present disclosure is not limited thereto.

TABLE 1

| Parameter | Description |
|---|---|
| *HEATER Sub-group* | |
| HEAT_EXCHANGER_TEMP | Temperature of heat exchanger |
| HEAT_EXCHANGER_RESISTIVITY | Resistivity of heat exchanger |
| SIDE1,2_HEATER_CURRENT_DISTANCE_FROM_SHOWER_HEAD | distance from heater to shower head |
| SIDE1,2_HEATER_POWER + OUTPUT | Power output of heater |
| SIDE1,2_HEATER_TEMP_READING | Temperature reading of heater |
| *RF Sub-group* | |
| SIDE1,2_HRF_FORWARD_POWER | RF forward power |
| SIDE1,2_HRF_IMPEDANCE_R | RF impedance (Reflective) |
| SIDE1,2_HRF_IMPEDANCE_I | RF impedance (Input) |
| SIDE1,2_HRF_ELECTRODE_BIAS | Electrode voltage |
| SIDE1,2_HRF_REFLECTED_POWER_COEFFICIENT | RF reflective power |
| *Pressure Sub-group* | |
| AR_CURRENT_FLOW | Ar flow rate |
| HE_ATRP_CURRENT_FLOW | He flow rate at during atom transfer radical polymerization |
| HE_MDEOS_CURRENT_FLOW | He flow rate of oxygenator |
| O2_LOW_CURRENT_FLOW | $O_2$ flow rate |
| HE_CURRENT_FLOW | He flow rate |
| MDEOS_CURRENT_FLOW | Flow rate of oxygenator |
| ATRP_CURRENT_FLOW | Flow rate of atom transfer radical polymerization |
| PRESSURE_READING | Chamber pressure reading |
| THROTTLE_VALVE_POS | Position of throttle valve |
| PRESSURE | Chamber pressure supplied |

Figure 4A:
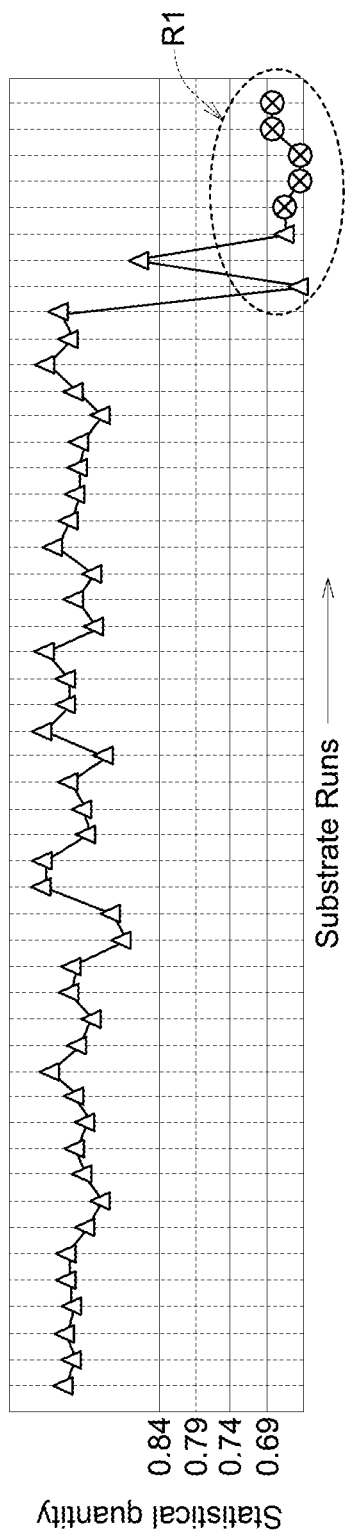
FIG. 4A presents a statistical quantity with respect to substrate runs according to an embodiment of the present disclosure.
Figure 4B:
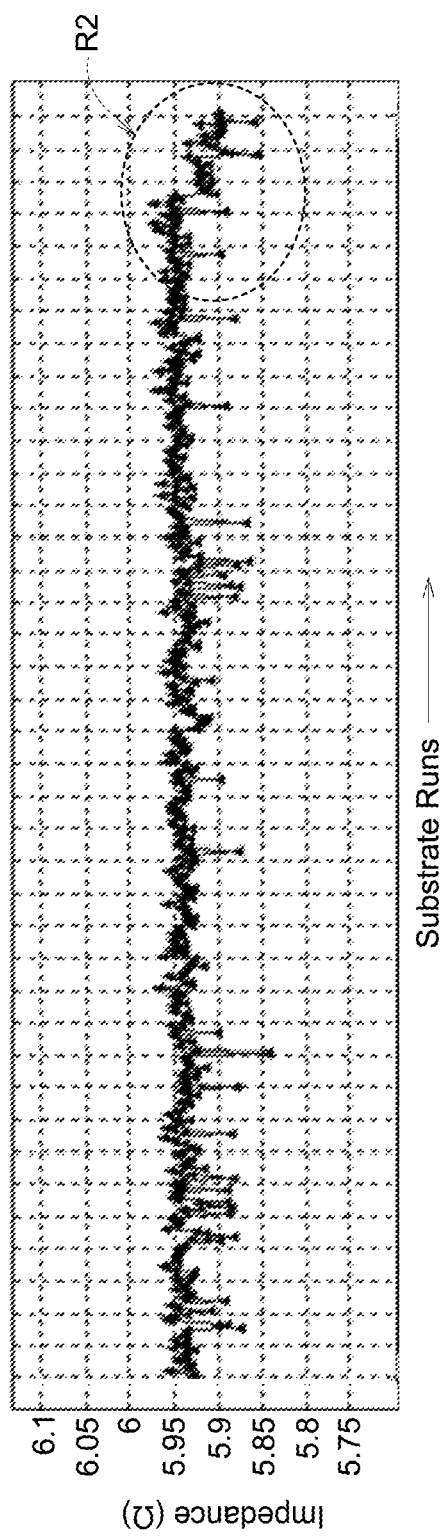
FIGS. 4B-4C respectively show measured impedance values of a single parameter with respect to substrate runs according to an embodiment of the present disclosure.
Figure 4C:
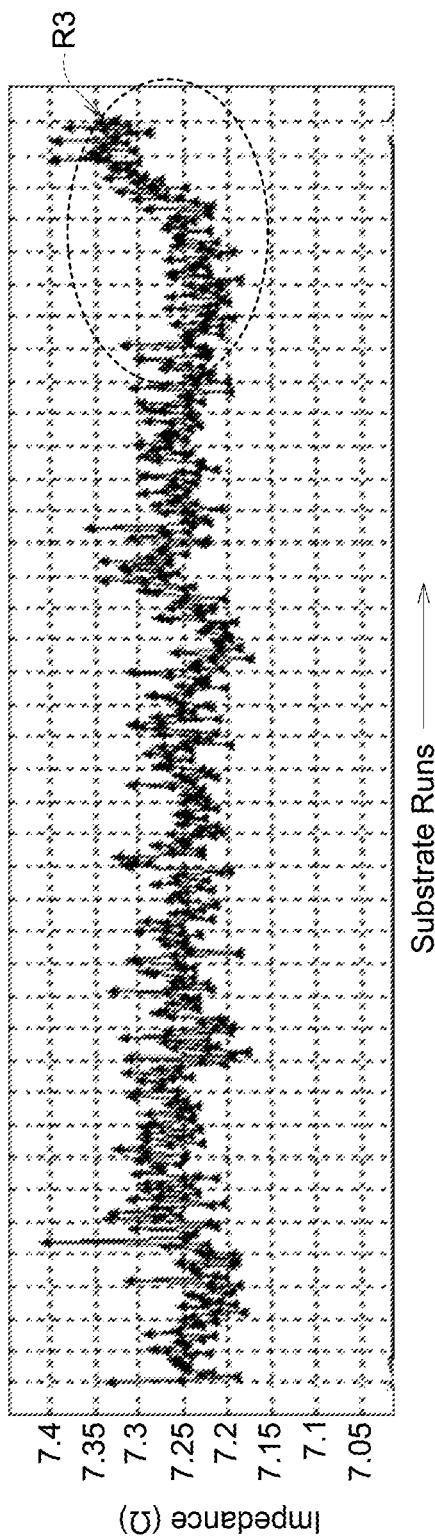

FIG. 4A presents a statistical quantity with respect to substrate runs according to an embodiment of the present disclosure, and FIGS. 4B-4C respectively show measured impedance values of a single parameter with respect to substrate runs according to an embodiment of the present disclosure. In the embodiment as shown in FIGS. 4A-4C, the RF Sub-group is taken as an example. In FIGS. 4A-4C, the y-axis represents substrate runs, and the number of substrates runs increases toward where the arrows point at; in other words, the number of substrate runs increases from the left side to the right side in FIGS. 4A-4C, and the data points of the curves on the right side belong to the substrates processed later in time than the substrates with the data points of the curves on the left side in the drawings.

As shown in FIGS. 4B and 4C, two types of impedance utilized in the processing system are monitored individually and two monitoring charts are presented. As shown in FIGS. 4B-4C, in the regions R2 and R3, the variance of impedance values are relatively minor to be detected and notified for sending alarm messages. On the contrary, as shown in FIG. 4A, the statistical quantity of the RF sub-group incorporating five correlated parameters of RF forward power, RF impedance (R), RF impedance (I), electrode voltage and RF reflect power is determined using a PCA model constructed from the data values of the above five correlated parameters with different weighting factors applied, the sensitivity to fault detection is greatly increased. As shown in FIG. 4A, the statistical quantity is determined to be 0.84, control limits with different tolerance of 0.79, 0.74 and 0.69 are further determined, and the values in the region R1 dramatically drops below the outlier limit of 0.69 indicating a fault detected.

Figure 5A:
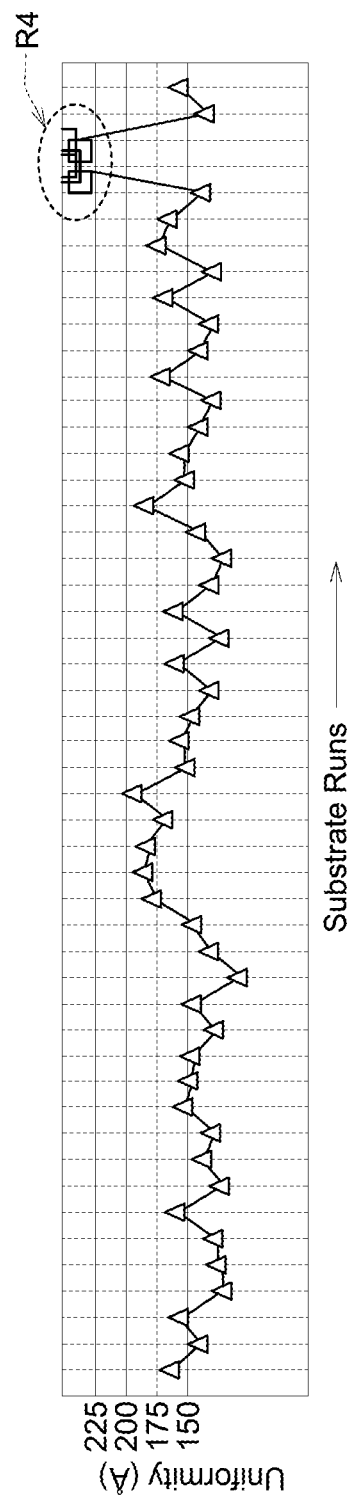
FIG. 5A shows measured film uniformity with respect to substrate runs according to an embodiment of the present disclosure.

In order to further verify the monitoring method of the embodiments of the present disclosure, the film thicknesses of the substrate runs of the embodiment in FIGS. 4A-4C are measured, and the substrate notified with a fault occurred is further observed. FIG. 5A shows measured film uniformity with respect to substrate runs according to the embodiment in FIGS. 4A-4C, and FIG. 5B shows a schematic drawing of the observed substrate surface which has been notified with a fault occurred as shown in FIG. 4A.

Figure 5B:
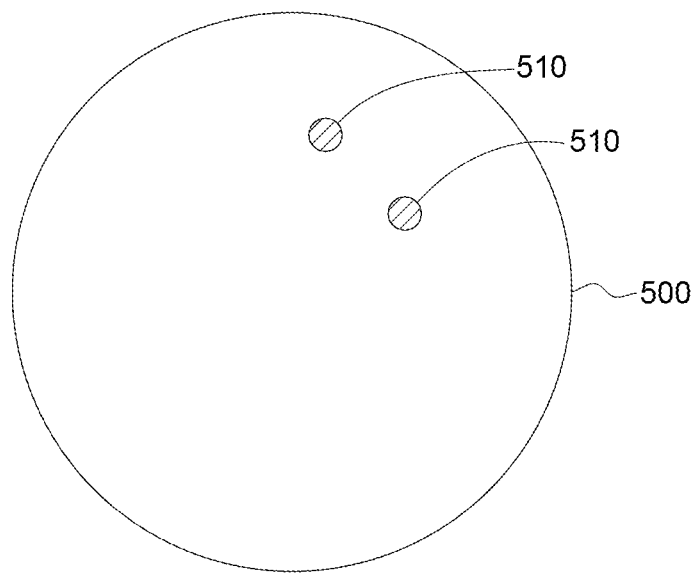
FIG. 5B shows a schematic drawing of a substrate surface.

As shown in FIG. 5A, the average film thickness of the substrates is about 150 Å, control limits with different tolerance are determined to be 175 Å, 200 Å and 225 Å, respectively. As shown in FIG. 5A, in the region R4, the film thickness jumps up to exceed even the outlier limit, and the measured value is 369 Å. Moreover, as shown in FIG. 5B, two large particles 510 are found to be located on the surface of the substrate 500. Accordingly, FIGS. 5A-5B prove that the fault detection is accurate and very sensitive to even minor variance in processing conditions.

Figure 6:
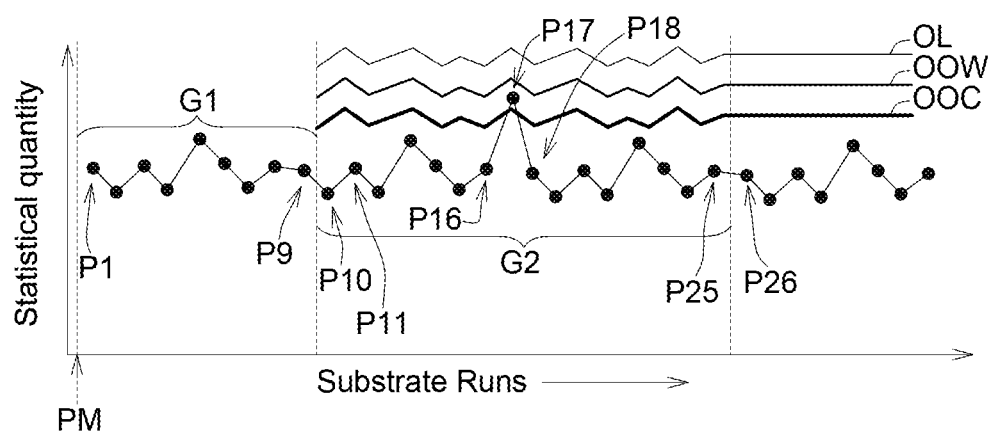
FIG. 6 presents a statistical quantity with respect to substrate runs according to another embodiment of the present disclosure.

FIG. 6 presents a statistical quantity with respect to substrate runs according to another embodiment of the present disclosure. To give a preview, FIG. 6 shows an example of auto-refreshing PCA models with applying a "training set" to further tune and update the PCA model.

As shown in FIG. 6, after a prevention maintenance step PM is performed, the second period of time starts. In the second period of time, a first group G1 of data values P1-P9 is acquired, and a second group G2 of data values P10-P25 is further acquired. In the embodiment, the second group of data values starts from data value P10, which is defined as a current data value, an estimated statistical quantity is determined using the first group of data values P1-P9, the current data value P10 does not exceed the estimated statistical quantity determined from data values P1-P9, and then an updated PCA model is constructed using the current data value P10, previous data values P1-P9 and the PCA model constructed before the prevention maintenance step PM.

Next, a current data value P11 is acquired, a renew estimated statistical quantity is further determined using the previous data values P1-P10, the current data value P11 does not exceed the renew estimated statistical quantity determined from data values P1-P10, and then a further updated PCA model is constructed using the current data value P11, previous data values P1-P10 and the PCA model constructed before the prevention maintenance step PM. This process can repeat multiple times to keep updating and tuning the updated PCA model with more additional data values of the second set of data values acquired, and this repeating process is called a "training set," in which the updated PCA model is constantly and slightly changing and auto-refreshing. In the "training set", since the estimated statistical quantity varies with every additional data value acquired, the control limits determined according thereto vary as well. For example, as shown in FIG. 6, the out-of-control limit OOC, the out-of-warning limit OOW and the outlier limit OL vary while tuning the PCA model.

Moreover, in the embodiment as shown in FIG. 6, the current data value P17 exceeds the current estimated statistical quantity determined from data values P1-P16, the current data value P17 will be abandoned, and another additional data value P18 will be acquired. Because the data value P18 does not exceed the current estimated statistical quantity determined from data values P1-P16, an updated PCA model will be constructed using the current data value P18, previous data values P1-P16 (excluding the data value P17) and the PCA model constructed before the prevention maintenance step PM.

In the embodiment as shown in FIG. 6, the "training set" ends at data value P25. Thus, instead of obtaining another renew estimated statistical quantity, an updated statistical quantity is determined from the updated PCA model constructed using a combination of the first group G1 and the second group G2 of the second set of data values P1-P25 acquired in the second period of time and the PCA model constructed in the first period of time, and monitoring and fault detection of the processing system according to the updated statistical quantity starts from data value P26. It is to be noted that the number of data values in the first group G1 and the second group G2 may vary according to actual needs and are not limited thereto.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of monitoring a processing system for processing a substrate, comprising:
    acquiring data from the processing system for a plurality of parameters in a first period of time, the data comprising a plurality of data values;
    grouping the parameters into a plurality of sub-groups, each of the sub-groups comprising a plurality of correlated parameters;
    constructing a principle components analysis (PCA) model from a first set of data values for the correlated parameters in a first one of the sub-groups;
    determining a statistical quantity using the PCA model;
    performing a prevention maintenance step to the processing system after the first period of time;
    acquiring a second set of data values for the correlated parameters in the first one of the sub-groups from the processing system in a second period of time after performing the prevention maintenance step, wherein the second set of data values comprise a first group of data values and a second group of data values acquired subsequent to the first group of data values;
    determining whether a current data value of the second group of data values exceeds an estimated statistical quantity or not, wherein the estimated statistical quantity is determined using a combination of precious data values of the second set of data values acquired in the second period of time and the PCA model, and the precious data values are at least one data value from the second group of data values; and
    constructing an updated PCA model using a combination of the current data value, the data values acquired previously and the PCA model for determining an updated statistical quantity when the current data value does not exceed the estimated statistical quantity, wherein a process is controlled based on the statistical quantity or the updated statistical quantity.

2. The method according to claim 1, wherein the prevention maintenance step comprises at least one of cleaning the processing system, replacing a component of the processing system, and repairing a component of the processing system.

3. The method according to claim 1, wherein constructing the PCA model comprises:
    normalizing the first set of data values in the first one of the sub-groups with a first weighting factor and a second weighting factor, wherein the first weighting factor is different from the second weighting factor.

4. The method according to claim 3, wherein constructing the PCA model further comprises:
    applying the first weighting factor to a first one of the first set of data values and the second weighting factor to a second one of the first set of data values in the first one of the sub-groups.

5. The method according to claim 1, further comprising:
    determining a control limit for the updated statistical quantity; and
    comparing the updated statistical quantity to the control limit, wherein a process fault has occurred when the updated statistical quantity exceeds the control limit.

6. The method according to claim 1, wherein each one of the sub-groups comprises less than ten correlated parameters.

7. The method according to claim 1, wherein the data comprises at least one of a temperature of a heat exchanger, a resistivity of a heat exchanger, a distance from a heater to a shower head, a power output of a heater, a temperature reading of a heater, an RF forward power, an RF impedance, an electrode voltage, an RF reflective power, an argon flow rate, a helium flow rate during an atom transfer radical polymerization (ATRP), a helium flow rate of an oxygenator, an oxygen flow rate, a helium flow rate, a flow rate of an oxygenator, a flow rate of an atom transfer radical polymerization, a chamber pressure reading, a position of a throttle valve, and a chamber pressure supplied.

8. The method according to claim 1, wherein the statistical quantity is a Hotelling T2 parameter.

9. A method of monitoring a processing system for processing a substrate, comprising:
    acquiring data from the processing system for a plurality of parameters in a first period of time, the data comprising a plurality of data values;
    grouping the parameters into a plurality of sub-groups, each of the sub-groups comprising a plurality of correlated parameters;
    constructing a principle components analysis (PCA) model from a first set of data values for the correlated parameters in a first one of the sub-groups;
    determining a statistical quantity using the PCA model;

performing a prevention maintenance step to the processing system after the first period of time;

acquiring a second set of data values for the correlated parameters in the first one of the sub-groups from the processing system in a second period of time after performing the prevention maintenance step, wherein the second set of data values comprise a first group of data values and a second group of data values acquired subsequent to the first group of data values;

determining whether a current data value of the second group of data values exceeds an estimated statistical quantity or not, wherein the estimated statistical quantity is determined using a combination of the data values of the second set of data values previously acquired in the second period of time and the PCA model; and constructing an updated PCA model using a combination of the current data value, the data values acquired previously and the PCA model for determining an updated statistical quantity when the current data value does not exceed the estimated statistical quantity, wherein a process is controlled based on the statistical quantity or the updated statistical quantity.

* * * * *